United States Patent [19]
Linzer et al.

[11] Patent Number: 6,108,039
[45] Date of Patent: Aug. 22, 2000

[54] LOW BANDWIDTH, TWO-CANDIDATE MOTION ESTIMATION FOR INTERLACED VIDEO

[75] Inventors: Elliot N. Linzer, Bronx, N.Y.; John Ju, San Jose, Calif.

[73] Assignee: C-Cube Microsystems, Inc., Milpitas, Calif.

[21] Appl. No.: 09/001,393

[22] Filed: Dec. 31, 1997

Related U.S. Application Data

[63] Continuation-in-part of application No. 08/652,231, May 23, 1996, Pat. No. 5,801,778.

[51] Int. Cl.[7] .............................. H04N 7/32; H04N 7/30
[52] U.S. Cl. ........................... 348/398; 348/416; 348/699
[58] Field of Search ................................. 348/398, 397, 348/416, 408, 699, 437–438; 382/240

[56] References Cited

U.S. PATENT DOCUMENTS

| | | | |
|---|---|---|---|
| 5,477,272 | 12/1995 | Zhang et al. | 348/699 |
| 5,585,852 | 12/1996 | Agarwal | 348/398 |
| 5,675,386 | 10/1997 | Lee et al. | 348/416 |
| 5,682,209 | 10/1997 | Borgwardt | 348/699 |
| 5,737,023 | 4/1998 | Linzer | 348/416 |
| 5,801,778 | 9/1998 | Ju | 348/416 |
| 5,818,969 | 10/1998 | Astle | 348/699 |

*Primary Examiner*—Vu Le
*Attorney, Agent, or Firm*—Proskauer Rose LLP

[57] ABSTRACT

A reference picture is processed to generate, first, second and third pictures. The first picture has a lower resolution than the second picture and the second picture has a lower resolution than the third picture. Using independent starting positions, first and second stage field motion estimation (motion vector) searches are preformed using the first and second pictures, respectively. By performing the first stage field motion estimation search, a first field motion vector candidate is obtained. By performing the second stage field motion estimation search, a second field motion vector candidate is obtained. Using at least one of the first and second field motion vector candidates as a starting position and the third picture, a third stage field motion estimation search is performed. Alternatively, a first stage field motion estimation search is performed using the first picture to obtain a first motion vector from a top reference field and a second motion vector from a bottom reference field. A second stage field motion estimation search is performed using the second picture to obtain a third motion vector from the top reference field and a fourth motion vector from a bottom reference field. Either the first motion vector is selected and the second motion vector is deselected or the second motion vector is selected and the first motion vector is deselected. Likewise, either the third motion vector is selected and the fourth motion vector is deselected or the fourth motion vector is selected and the third motion vector is deselected. Using the selected motion vectors as starting positions and the third picture, a third stage field motion estimation search is performed.

22 Claims, 4 Drawing Sheets

LOW BANDWIDTH, TWO-CANDIDATE MOTION ESTIMATION FOR INTERLACED VIDEO

RELATED APPLICATIONS

This application is a continuation in part of U.S. patent application Ser. No. 08/652,231, entitled "Video Encoding with Multi-Stage Projection Motion Estimation, " filed on May 23, 1996 for John Ju, now U.S. Pat. No. 5,801,778, which is incorporated herein by reference.

FIELD OF THE INVENTION

The present invention relates to motion estimation and motion compensation in video encoding and more particularly to performing motion estimation and motion compensation mode selection using projection techniques.

BACKGROUND OF THE INVENTION

Conventional video compression techniques, such as MPEG-1, MPEG-2, H.261, H.262 and H.263 use both spatial and temporal compression or "encoding". A detailed discussion of spatial and temporal encoding may be found in B. Haskell, A. PURI & A. NETRAVALI, DIGITAL VIDEO: AN INTRODUCTION TO MPEG-2, ch.6.4, 6.5, and 7 (1997). For example in MPEG-2, a to-be-compressed, i.e., "to-be-encoded" picture (herein, "picture" means frame or field as per MPEG parlance) is divided into macroblocks. Each macroblock includes an array of I×J luminance blocks and of an array of K×L total blocks (i.e., including chrominance blocks), where each luminance or chrominance block has N×M pixels. Macroblocks may be spatially only encoded or both temporally and spatially encoded. Spatial encoding includes, for each luminance and chrominance block of the macroblock, discrete cosine transforming the pixels of the block, quantizing the block of transform coefficients, (zig zag or alternate) scanning each quantized block of coefficients, zero run length encoding the scanned values into run-level pairs and variable length coding each run-level pair.

Temporal encoding typically involves finding a prediction macroblock for each to-be-encoded macroblock. The prediction macroblock is subtracted from the to-be-encoded macroblock to form a prediction error macroblock. The individual blocks of the prediction error macroblock are then spatially encoded.

Each prediction macroblock originates in a picture other than the to-be-encoded picture, called a "reference picture." A single prediction macroblock may be used to "predict" a to-be-encoded macroblock or multiple prediction macroblocks, each origination in a different reference picture, may be interpolated, and the interpolated prediction macroblock may be used to "predict" the to-be-encoded macroblock. (Preferably, the reference picture, themselves, are first encoded and then decompressed or "decoded." The prediction macroblocks used in encoding are selected from "reconstructed pictures" produced by the decoding process.) Reference pictures temporally precede or succeed the to-be-encoded picture in the order of presentation or display. To be more precise, three kinds of encoded pictures may be produced, namely, intra pictures or I pictures predicted pictures or P pictures and bidirectionally predicted pictures or B pictures. I pictures contain spatially only encoded macroblocks but no temporally encoded macroblocks. P and B pictures can contain spatially only encoded macroblocks and spatially and temporally encoded macroblocks. In P pictures, the reference pictures used to predict and temporally encode the spatially and temporally encoded macroblocks only precede the encoded P picture. In B pictures the reference pictures can both precede and succeed the encoded B picture.

MPEG-2 supports several different types of prediction modes which can be selected for each to-be-encoded macroblock, based on the types of predictions that are permissible in that particular type of picture. Of the available prediction modes, two prediction modes are described below which are used to encoded frame pictures. According to a "frame prediction mode" a macroblock of a to-be-encoded frame picture is predicted by a frame prediction macroblock formed from one or more reference frames. For example, in the case of a forward only predicted macroblock, the prediction macroblock is formed from a designated preceding reference frame. In the case of backward only predicted macroblock, the prediction macroblock is formed from a designated succeeding reference frame. In the case of a bidirectionally predicted macroblock, the prediction macroblock is interpolated from a first macroblock formed from the designated preceding reference frame and a second prediction macroblock formed from the designated succeeding reference frame.

According to a "field prediction mode for frames" a macroblock of a to-be-encoded frame picture is divided into to-be-encoded top and bottom field macroblocks. A field prediction macroblock is separately obtained for each of the to-be-encoded top and bottom field macroblocks. Each field prediction macroblock is selected from top and bottom designated reference fields. The particular fields designated as reference fields depend on whether the to-be-encoded field macroblock is the first displayed field of a P-picture, the second displayed field of a P-picture or either field of a B-picture. Other well known prediction modes applicable to to-be-encoded field pictures include dual prime, field prediction of field pictures and 16×8 prediction See B. HASKELL, A. PURI & A. NETRAVALI, DIGITAL, VIDEO: AN INTRODUCTION TO MPEG-2, ch. 7.2 (1997). For sake of brevity, these modes are not described herein.

Prediction macroblocks often are not at the same relative spatial position (i.e., the same pixel row and column) in the reference picture as the to-be-encoded macroblock spatial position in the to-be-encoded picture. Rather, a presumption is made that each prediction macroblock represents a similar portion of the image as the to-be-encoded macroblock, which image portion may have moved spatially between the reference picture and the to-be-encoded picture. As such, each prediction macroblock is associated with a motion vector, indicating a spatial displacement from the prediction macroblock's original spatial position in the reference field to the spatial position corresponding to the to-be-encoded macroblock. This process of displacing one or more prediction macroblocks using a motion vector is referred to as motion compensation.

In motion compensated temporal encoding, the best prediction macroblock(s) for each to-be-encoded macroblock is generally not known ahead of time. Rather, a presumption is made that the best matching prediction macroblock is contained in a search window of pixels of the reference picture around the spatial coordinates of the to-be-encoded macroblock (if such a prediction macroblock exists at all). Given a macroblock of size I×J pixels, and a search range of ±H pixels horizontally and ±V pixels vertically, the search window is of size (I+2H)(J+2V). A block matching technique may be used, whereby multiple possible prediction macroblock candidates at different spatial displacements (i.e., with different motion vectors) are extracted from the search window and compared to the to-be-encoded macroblock. The best matching prediction macroblock candidate may be selected, and its spatial displacement is recorded as the motion vector associated with the selected prediction macroblock. The operation by which a prediction macroblock is selected, and its associated motion vector is determined, is referred to as motion estimation.

Block matching in motion estimation requires identifying the appropriate search window for each to-be-encoded macroblock (that can possibly be temporally encoded). Then multiple candidate macroblocks of pixels must be extracted from each search window and compared to the to-be-encoded macroblock. According to MPEG-2 chrominance format 4:2:0, each macroblock includes a 2×2 arrangement of four (8×8 pixel) luminance blocks (illustratively, block matching is performed only on the luminance blocks). If each to-be-encoded picture is a CIF format picture (352×288 pixels for NTSC frames and 352×144 for NTSC fields), then the number of to-be-encoded macroblocks is 396 for frame pictures and 196 for each field picture. According to MPEG-2, the search range can be as high as ±128 pixels in each direction. Furthermore, consider that MPEG-2 often provides a choice in selecting reference pictures for a to-be-encoded picture (i.e., a field-frame choice or a forward only, backward only or bidirectional interpolated choice). In short, the number of potential candidate prediction macroblocks is very high. An exhaustive comparison of all prediction macroblock candidates to the to-be-encoded macroblock may therefore be too processing intensive for real-time encoding. Nevertheless, an exhaustive search can provide better memory access efficiency due to the overlap in pixels in each prediction macroblock candidate compared against a given to-be-encoded macroblock. For example, consider that a retrieved prediction macroblock candidate of 16×16 pixels includes a sub-array of 15×16 pixels of the prediction macroblock candidate to the immediate right or left (an of course a sub-array of 16×15 pixels of the prediction macroblock candidate immediately above or below). Thus only the missing 1×16 column of pixels need be retrieved to form the next left or right prediction macroblock candidate (or the missing 1×16 row of pixels need be retrieved to form the next above or below prediction macroblock candidate).

According to another technique, a hierarchical or telescopic search is performed, in which fewer than all possible choices are examined. These techniques, while computationally less demanding, are more likely to fail to obtain the optimal or best matching prediction macroblock candidate. As a result, more bits are needed to encode the to-be-encoded macroblock in order to maintain the same quality than in the case where the best matching macroblock is obtained, or, if the number of bits per picture is fixed, the quality of the compressed picture will be degraded. Note also, that the memory access efficiency is lower for the hierarchical search, since by definition, the amount of overlapping pixels between each prediction macroblock will be lower.

Other techniques have been suggested in M. Ghanbari, *The Cross-Search Algorithm for Motion Estimation,* IEEE TRANS. ON COMM. Vol. 38, no. 7, pp. 950–953, July, 1990; B. Liu and A. Zaccarin, *New Fast Algorithms for the Estimation of Block Motion Vectors,* IEEE TRANS ON CIR. & SYS. FOR VIDEO TECH., vol. 3, no. 2, pp. 148–157, April, 1993; and P. Anandan, *A Computational Framework and an Algorithm for the Measurement of Visual Motion,* INT'L J. COMP. VISION, no. 2, pp. 283–310 (1989). The techniques described in the first two references do not work well with typical memory architectures which store the reference or to-be-encoded picture data. The latter reference is not well-suited for block based motion estimation and does not describe a computationally efficient technique.

The above-identified patent application incorporated herein by reference teaches an alternative motion estimation technique, which is illustrated in FIG. 1. According to this technique, multiple reduced resolution versions of the to-be-encoded frame and reference frames are generated. For example, $\frac{1}{64}$, $\frac{1}{16}$ and $\frac{1}{4}$ resolution version of the original to-be-encoded and reference picture may be formed. A first stage motion estimation search ME0 is then performed on the $\frac{1}{64}$ resolution version of the frame. The first stage motion estimation search ME0 includes five searches for identifying five prediction macroblocks in the forward prediction direction for each to-be-encoded macroblock of the to-be-encoded frame. The five searches include: (1) searching the reference frame for frame prediction macroblock candidates, (2) searching the top reference field for top field prediction macroblock candidates for the to-be-encoded top field macroblocks, (3) searching the top reference field for top field prediction macroblock candidates for the to-be-encoded bottom field macroblocks, (4) searching the bottom reference field for bottom field prediction macroblock candidates for the to-be-encoded top field macroblocks, and (5) searching the bottom reference field for bottom field prediction macroblock candidates for the to-be-encoded bottom field macroblocks. If backwards prediction is permitted, the first stage motion estimation search includes five additional searches for identifying prediction macroblocks in the backward prediction direction (i.e., identifying prediction macroblock candidates in succeeding reference pictures). In this first stage, each search window is centered at the same spatial coordinates of the to-be-encoded macroblock for which the block matching is performed, and thus, the initial starting point of the search is a (0,0) spatial displacement or motion vector. A motion vector is obtained for each identified prediction macroblock candidate by virtue of the searches.

A similar second stage motion estimation search ME1 is then performed on the $\frac{1}{16}$ resolution version of the to-be-encoded frame. Like the first stage motion estimation search ME0, the second stage motion estimation search uses the (0,0) motion vector as the initial starting point for each search window.

The motion vectors identified in the first motion estimation stage ME0 are then scaled by 4 and the motion vectors obtained in the second motion estimation stage ME1 are then scaled by 2. A third stage motion estimation ME2 is then performed on the $\frac{1}{4}$ resolution version of the to-be-encoded frame. However, unlike the first and second motion estimation search stages ME0 and ME1, the third motion estimation search stage ME2 uses the vectors of the first and second motion estimation search stages ME0 and ME1 as initial starting points. In other words, the search window for each search on each macroblock is centered about a respective prediction macroblock identified by one of the motion vectors determined in the first or second motion estimation search stages ME0 and ME1. Thus, in the third motion estimation search stage ME2, ten searches (one of each of the five searches using the results from stage one and one of each of the five searches using the results from stage two) or twenty searches (if both forward and backward prediction are permissible) are performed to produce ten (or twenty) motion vectors for each to-be-encoded macroblock.

After performing the third motion estimation search stage ME2, a decision is made for each to-be-encoded macroblock, on a macroblock-by-macroblock basis, as to which parity reference field should be used to predict the to-be-encoded top field and which parity reference field should be used to predict the to-be-encoded bottom field. This decision is referred to as a "motion vertical field select" decision as per the MPEG-2 syntax. As a result of this decision, four motion vectors are discarded for each to-be-encoded macroblock (or in the case that backward prediction is permitted, eight motion vectors are discarded). In particular, the two (four) motion vectors obtained in the first and second motion estimation search stages ME1 and ME2 having the parity not selected for the top field, and the two (four) motion vectors obtained in the first and second motion estimation search stages ME1 and ME2 having the parity not selected for the bottom field, of the to-be-encoded macroblock, are discarded.

The remaining six (or twelve) motion vectors are then scaled by two. A fourth stage motion estimation search stage ME3 is then performed on the original resolution to-be-encoded picture using the scaled motion vectors as a starting point. This produces six (or twelve) motion vectors, each corresponding to a respective prediction macroblock. The best matching prediction macroblock is then selected. In so selecting, a field/frame prediction decision is made and a forward only, backward only or interpolated macroblock decision may be made. It is also possible to make the field/frame decision the forward only, backward only or interpolated prediction decisions, or both types of decisions before the ME3 stage.

Because the third motion estimation stage ME2 searches uses the results of the first and second stage ME0 and ME1 searches as an initial starting point, it is possible to search a smaller search window in the third motion estimation stage ME2. Furthermore, an exhaustive search in the smaller search window can be performed to ensure that an optimal search is performed. Likewise, the fourth motion estimation search stage ME3 uses the motion vectors obtained in the third motion estimation search stage ME2 and therefore can exhaustively search smaller window. As a result, computations are reduced yet near optimal results are achieved.

Thus, the motion estimation dramatically reduces the number of computations yet provides near optimal motion estimation.

It is an object to further improve on the projection motion estimation technique to further reduce computation requirements without a substantial effect on picture quality or bit rate.

SUMMARY OF THE INVENTION

This and other objects are achieved according to the present invention. According to a first embodiment, a method is provided for performing motion estimation on a sequence of video pictures. A reference picture is processed to generate, first, second and third pictures. The first picture has a lower resolution than the second picture and the second picture has a lower resolution than the third picture. Using independent starting positions, first and second stage field motion estimation (motion vector) searches are preformed using the first and second pictures, respectively. By performing the first stage field motion estimation search, a first field motion vector candidate is obtained. By performing the second stage field motion estimation search, a second field motion vector candidate is obtained. Using at least one of the first and second field motion vector candidates as a starting position and the third picture, a third stage field motion estimation search is performed.

Illustratively, frame motion estimation is also performed on the reference picture using "single candidate, hierarchical" motion estimation. This is, two or more stages of frame motion estimation searches are also performed, each successive frame motion estimation search stage being performed on a higher resolution version of the reference picture than the previous search stage. Each successive frame motion estimation search stage furthermore uses the frame motion vector obtained in the previous frame motion estimation search stage as a search starting position.

Thus, multiple field motion vector candidates are obtained independently in "parallel" stages, namely, at least one candidate is obtained in the first stage and at least one candidate is obtained in the second stage. One or more of these candidates is selected for use as a starting position for the third stage. On the other hand, the frame motion vectors are obtained "dependently" and "in sequence." As a result, the total number of frame motion vectors for which a search must be performed in a later stage is reduced.

According to another embodiment, motion estimation is performed on a sequence of video pictures as follows. As before, a reference picture is processed to generate, first, second and third pictures. The first picture has a lower resolution than the second picture and the second picture has a lower resolution than the third picture. A first stage field motion estimation search is performed using the first picture to obtain a first motion vector from a top reference field and a second motion vector from a bottom reference field. As second stage field motion estimation search is performed using the second picture to obtain a third motion vector from the top reference field and a fourth motion vector from the bottom reference field. Either the first motion vector is selected and the second motion vector is deselected or the second motion vector is selected and the first motion vector is deselected. Likewise, either the third motion vector is selected and the fourth motion vector is deselected or the fourth motion vector is selected and the third motion vector is deselected. Using the selected motion vectors as starting positions and the third picture, a third stage field motion estimation search is performed.

Illustratively, according to this embodiment, a preliminary "motion vertical field select" decision, i.e., the decision of whether to use the top reference field or the bottom reference field for prediction, is made early in the search process. The decision is made after performing the first and second field motion estimation search stages, but before performing the third motion estimation search stage that uses one or more selected motion vectors of the first and second stages as an initial starting position. The final motion vertical field select decision will depend on whether a vector that originates from the first stage is chosen or a vector that originates from the second stage is chosen. Specifically, if the motion vector ultimately chosen for motion compensation is derived from either the first or third motion vector (which vectors both point to predictor in the top field or the reference picture) then the selected vertical field will be the top field. On the other hand, if the motion vector ultimately chosen for motion compensation is derived from either the second or fourth motion vector (which vectors both point to a predictor in the bottom field of the reference picture) then the selected vertical field will be the bottom field. Nevertheless, the preliminary motion vertical field select decision reduces the total number of motion vector candidates for which a search must be performed in each later stage, such as the third stage field motion estimation search.

In both embodiments, the total number of motion vectors for which a search must be performed in a later stage is reduced. This reduces the processing demands on the video encoder. To maintain quality, the search ranges, i.e., the search windows, at one or more search stages can be increased. Although increasing the search windows tends to increase the number of computations, the demands on the memory architecture of the encoder are only increased by a marginal amount. This is because the searches can be exhaustive searches. According to exhaustive searches, adjacent pixel data must be retrieved for forming each search window, and retrieved search window pixel data tends to be reused frequently to form multiple different prediction candidates.

DETAILED DESCRIPTION OF THE INVENTION

The invention is now illustrated in conjunction with an exemplary video encoder that produces an MPEG-2 compliant bitstream. However, the invention is applicable to motion estimation according to any encoding standard. Furthermore, the present invention can be used in non-encoding applications such as standards conversion, camera motion reduction, etc.

Figure 2:
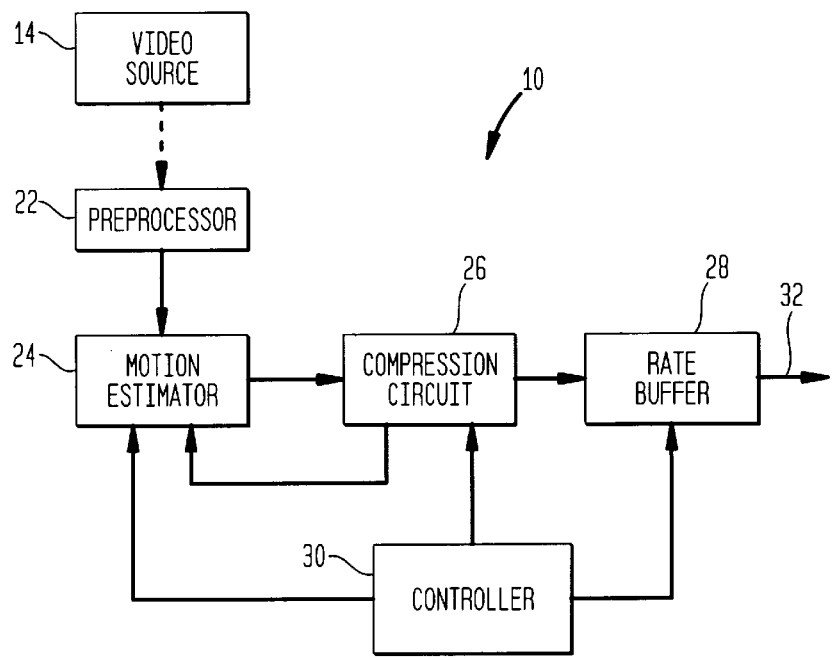
FIG. 2 shows a video encoder.

FIG. 2 shows a video encoding system 10 according to a embodiment of the present invention. The video encoding system 10 includes a digital video source 14 which may include a video camera, a video tape player, a telecine machine or other suitable video source. The video source 14 supplies an input video frame sequence to a preprocessor 22. The video encoding system 10 also includes a motion estimator 24, a compression circuit 26, a rate buffer 28 and a controller 30, all of which may be elements of one or more processors in an MPEG-2 compliant encoder. The operations of the motion estimator 24, compression circuit 26, and rate buffer 28 are directed in this exemplary video encoding system 10 by the controller 30. The resultant encoded video bit stream produced at the output of the rate buffer 28 is transmitted via transmission channel 32 to one or more decoders which decode the encoded video bit stream. Alternatively, the encoded video bit stream may be transmitted via channel 32 to a storage medium or record carrier such as a memory (e.g., ROM), magnetic tape, magnetic disk, optical disc (e.g., CD or DVD), etc.

The preprocessor 22 processes the video signal so that it may be properly compressed using the motion estimator 24 and compression circuit 26. For example, the preprocessor 22 may alter the format of each frame in terms of the horizontal or vertical pixel resolution in order to satisfy parameters specified by the motion estimator 24 or compression circuit 26. An exemplary set of preprocessing operations used to generate different resolution pictures for use in the motion estimation of the present invention will be described below. The preprocessor 22 may also be used to detect scene changes or other characteristics of the video sequence which increase compression difficulty. A scene change generally increases the amount of bits required because predictive encoding cannot initially be used. If the preprocessor 22 detects a scene change, this information may be communicated to the compression circuit 26 and controller 30. A fade, representing a continuous decrease or increase in luminance level to or from black over several frames, can also cause difficulties for the compression circuit 26 because it can cause a failure in motion compensated prediction. The preprocessor 22 can detect and inform the compression circuit 26 of a fade so that the compression circuit 26 can take appropriate precautions.

The motion estimator 24 receives a video signal from the preprocessor 22 in the form of a sequence of frames or fields, and performs motion estimation operations to be described in greater detail below. The compression circuit 26 utilizes motion vectors and other information supplied by motion estimator 24 to generate a compressed digital video bit stream compliant with the syntax specified in MPEG-2 or another suitable video compression standard. The video bit stream generated by the compression circuit 26 is stored in a rate buffer 28. The controller 30 controls the number of bits allocated by the compression circuit 26 to the frames or fields to be encoded. The controller 30 allocates bits to the frames or fields so as not to exceed the bandwidth in the channel 32 and so as to maintain certain limits on the occupancy of the rate buffer 28. This is turn prevents overflow and/or underflow conditions in a decoder buffer receiving the bit stream from the transmission channel 32, a storage device or other source of encoded video. The present invention provides improved motion estimation (ME) techniques which may be implemented using the preprocessor 22, motion estimator 24, compression circuit 26 and controller 30 of FIG. 2, or other suitably configured video processing hardware, firmware and/or software. It should be noted that the preprocessor 22, motion estimator 24 and compression circuit 26 may represent different portions of a single digital data processor, or different functional operations performed using such a data processor. For example, the preprocessor 22, motion estimator 24 and compression circuit 26 may perform operations utilizing, at least in part, the same processor hardware.

Figure 3:
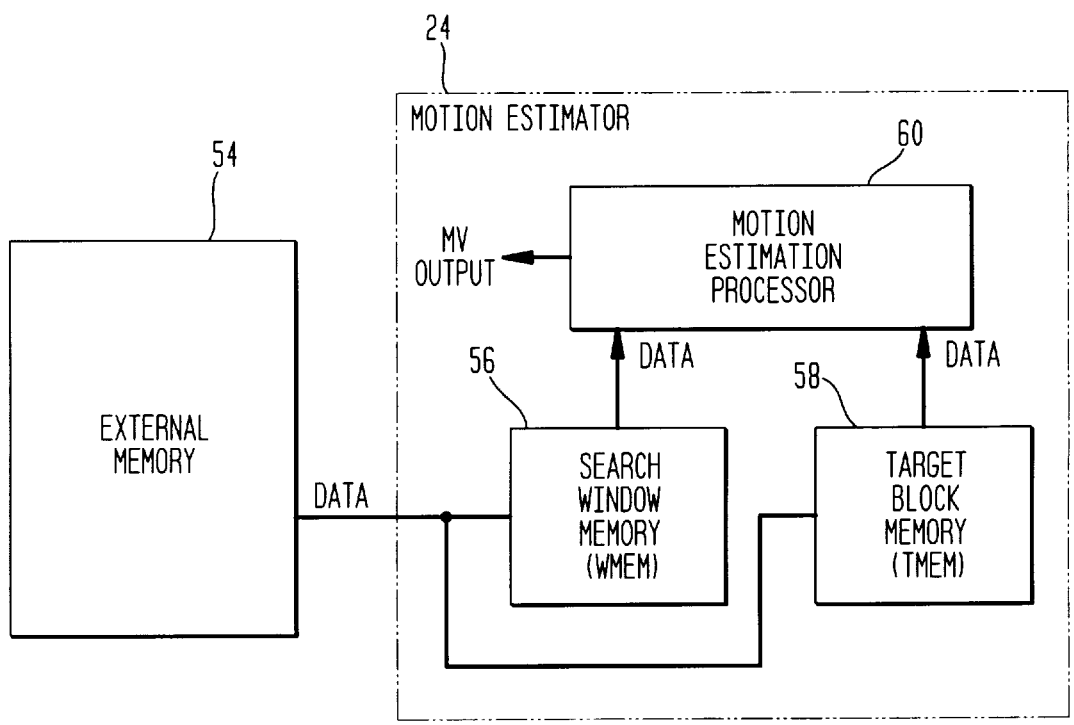
FIG. 3 shows a motion estimator in the video encoder of FIG. 2.

FIG. 3 shows an exemplary implementation of a motion estimator 24 in accordance with the present invention. This exemplary implementation is used to illustrate the memory access operations associated with motion estimation, and should not be construed as limiting the invention to any particular type of implementation. For example, the motion estimator 24 may be a portion of a single-chip application-specific integrated circuit (ASIC) or other circuit which provides video compression operations to be described below, and which may also incorporate various functions of the preprocessor 22, compression circuit 26 and controller 30 of FIG. 2. The motion estimator 24 of FIG. 3 may receive picture data from an external memory 54 which may be an off-chip synchronous dynamic random access memory (SDRAM) contained within a video encoder 10 but not within the motion estimator 24. The external memory 54 may be used to store, for example, decimated pictures generated by the preprocessor 22 for use in the motion estimation process. The motion estimator 24 includes internal or on-chip memory in the form of a search window memory (WMEM) 56 and a target block memory (TMEM) 58, which may be different portions of a single internal memory. The WMEM 56 and TMEM 58 are used to hold search window data and target block data, respectively, for a given picture as received from the external memory 53. Illustratively, TMEM 58 holds only a single 8×8 block of pixel data at a time and motion estimation is separately performed for each (luminance) block of the macroblock. A motion vector candidate is then determined for the entire macroblock based on the motion estimation results for each block of the macroblock. The motion estimator 52 also includes an ME processor 60 which performs searching operations using the data stored in WMEM 56 and TMEM 58, and generates motion vectors which are used in the compression circuit 26.

PREPROCESSING

Figure 1:
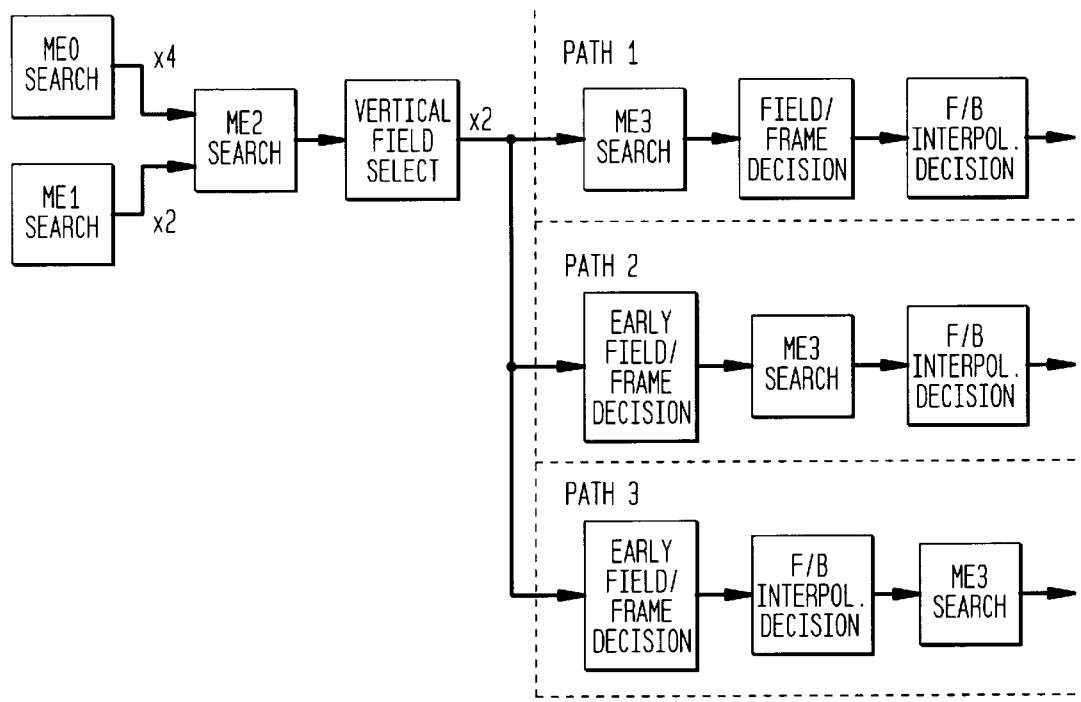
FIG. 1 shows a projection motion estimation process.

As described below, the different motion estimation search stages utilize different resolution pictures. Preprocessing is used to generate these different resolution pictures from the original video frame sequence. Both the to-be-encoded and reconstructed reference pictures are scaled to the appropriate resolutions noted below. The preprocessing may be performed in the preprocessor 22 and/or motion estimator 24 of FIG. 1. In this example, captured luminance (Y) pictures are filtered and subsampled horizontally and vertically to obtain CIF resolution pictures in both field and frame formats. The CIF pictures represent ¼ size pictures relative to the original CCIR601 picture. The CIF pictures are again filtered and subsampled horizontally and vertically to obtain QCIF pictures in both and field frame formats. The QCIF pictures represent ¹⁄₁₆ size pictures relative to the original CCIR601 pictures. The QCIF pictures are further filtered and subsampled to obtain QQCIF pictures in both field and frame formats. The QQCIF pictures represent ¹⁄₆₄ size pictures relative to the original CCIR601 pictures. The filters used may be simple averaging filters such as two-tap filters with filter coefficients (½,½). The resulting subsampled frames are used in frame ME searches, and the resulting subsampled fields are used in field ME searches. Table 1 below shows the picture resolutions produced by this exemplary preprocessing operation and the number of pixels to be stored.

TABLE 1

| Picture | Frame | Top Field | Bottom Field | Total |
| --- | --- | --- | --- | --- |
| CCIR601 | 720 × 480 | 720 × 240 | 720 × 240 | 345,600 |
| CIF | 360 × 240 | 360 × 120 | 360 × 120 | 172,800 |
| QCIF | 180 × 120 | 180 × 60 | 180 × 60 | 43,200 |
| QQCIF | 90 × 60 | 90 × 30 | 90 × 30 | 10,800 |
| TOTAL | 459,000 | 56,700 | 56,700 | 572,400 |

Figure 4:
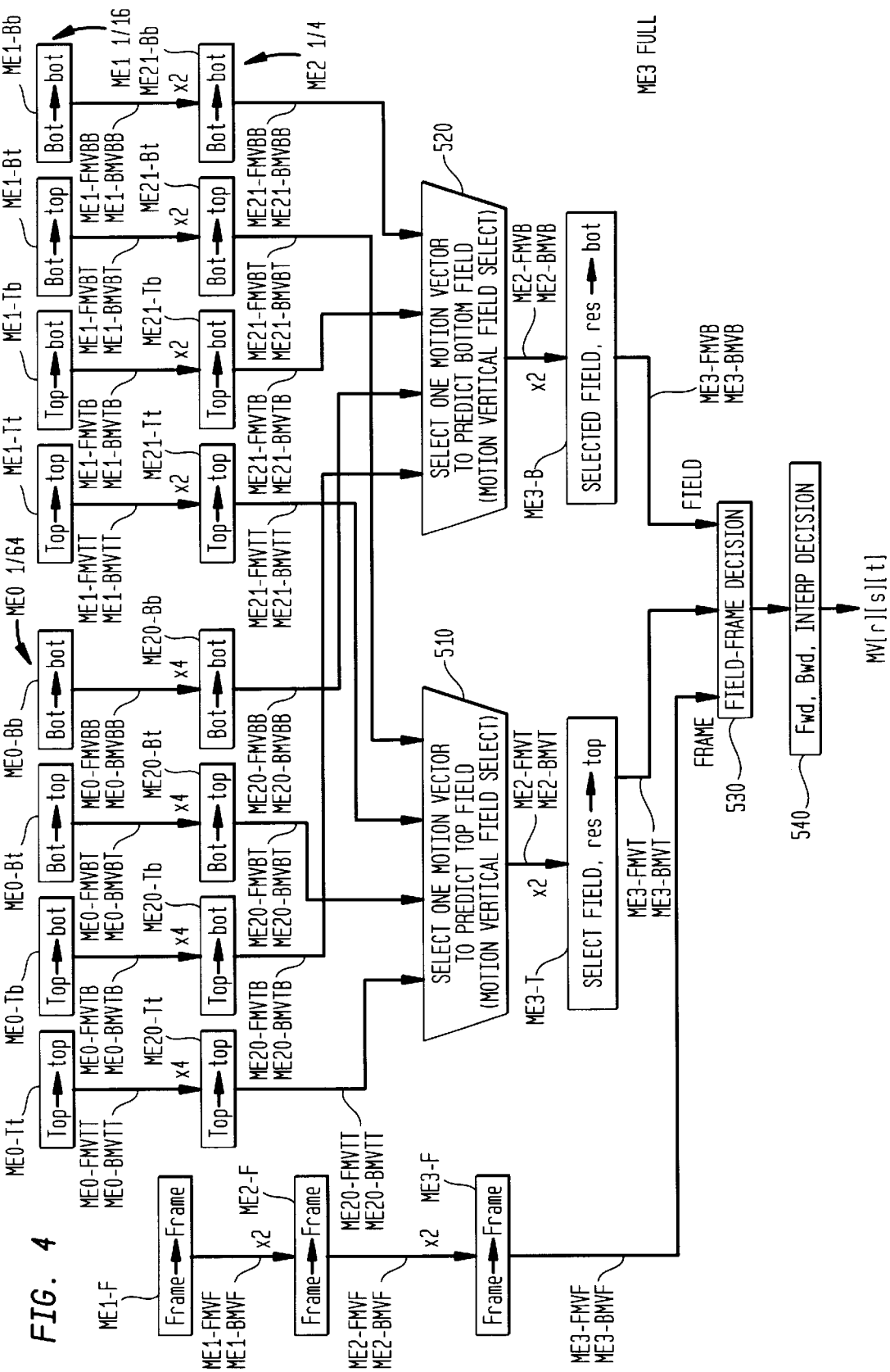
FIG. 4 shows a projection motion estimation process according to a first embodiment.
Figure 5:
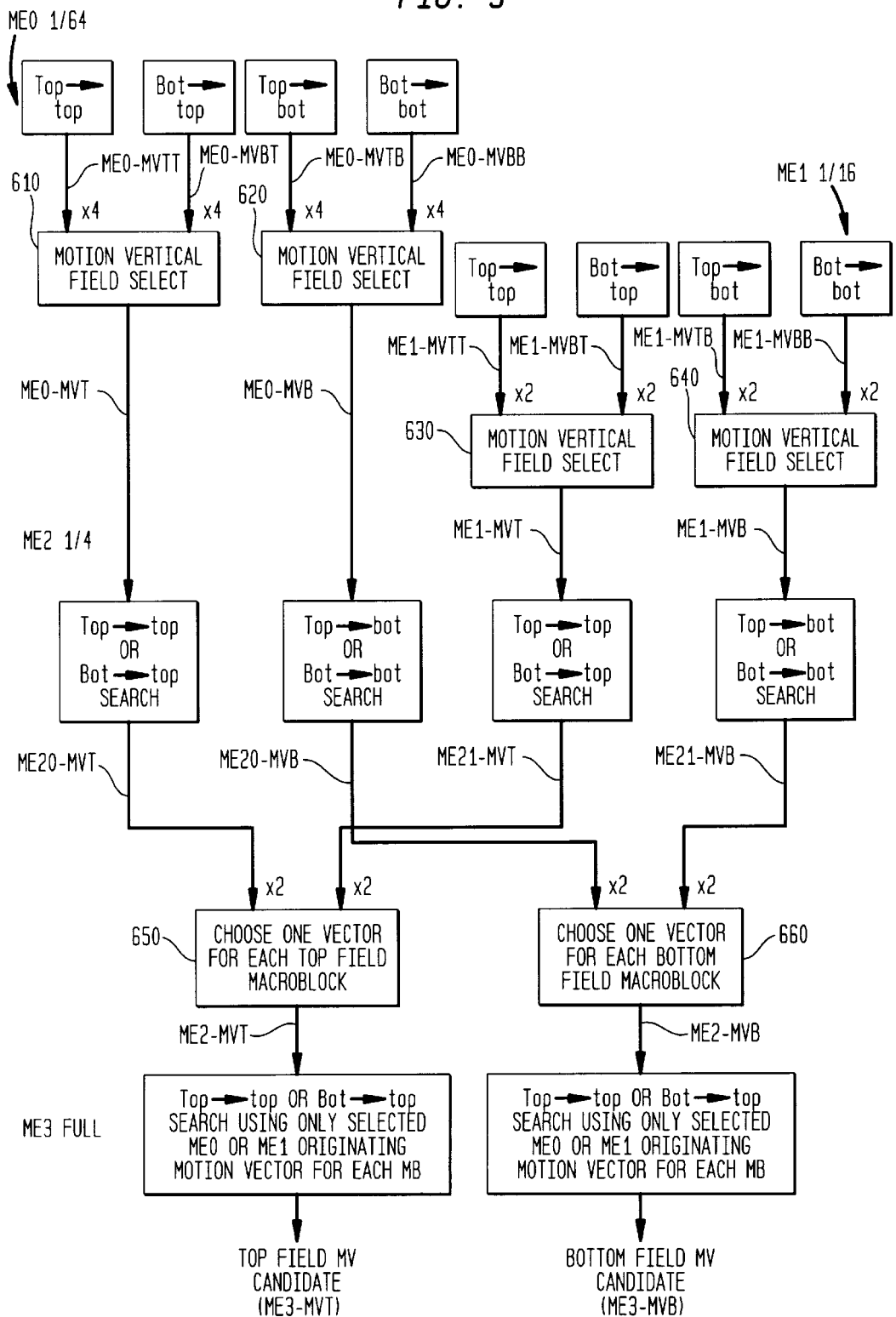
FIG. 5 shows a projection motion estimation process according to a second embodiment.

FIG. 4 is a flow diagram illustrating the motion estimation process according to a first embodiment of the present invention. FIG. 5 is a flow diagram illustrating a motion estimation process according to a second embodiment of the present invention. In FIGS. 4 and 5, a search for the best matching reference field macroblock and motion vector in a top field of a reference frame that predicts each to-be-encoded top field of a macroblock is designated "Top→top". Likewise, "Bot→bot" represents the search for the best matching reference field macroblock and motion vector in a bottom reference frame that predicts each to-be-encoded bottom field of a macroblock. "Top→bot" represents the search for the best matching reference field macroblock and motion vector in a top field of a reference frame that predicts each to-be-encoded bottom field of a macroblock. "Bot→top" represents the search for the best matching reference field macroblock and motion vector in a bottom field of a reference frame that predicts each to-be-encoded top field of a macroblock. ME0 represents a first stage motion estimation search on a lowest resolution version of the reference pictures (e.g., ¹⁄₆₄ resolution). ME1 represents a second stage motion estimation search on a second lowest resolution version of the reference pictures (e.g., ¹⁄₁₆ resolution). ME2 represents a third stage motion estimation search on a third lowest resolution version of the reference pictures (e.g., ¼ resolution). ME3 represents a fourth stage motion estimation search on an original resolution version of the reference pictures, where "original resolution" can mean the resolution at which the picture is encoded for transmission to the decoder. Illustratively, the encoded pictures are CCIR601 video frames (with a resolution of 720×480 pixels×29.97 frames/sec) comprising top and bottom fields. Both frame prediction and field prediction of frame motion compensation modes and motion estimation searches are performed. However, this merely illustrative; other combinations of motion compensation modes and motion estimation searches, such as 16×8, dual prime, etc. are possible.

MULTIPLE CANDIDATE FIELD SEARCH, SINGLE CANDIDATE FRAME SEARCH

FIG. 4 depicts a flow diagram for a first embodiment, according to which the motion estimation processor 60 obtains multiple candidates in motion estimation search stages. The motion estimation processor 60 performs the first stage motion estimation search ME0 using the (QQCIF )¹⁄₆₄ resolution reference and to-be-encoded fields. Assume for example that the to-be-encoded frame is a P-frame. In performing the stage ME0, the motion estimation processor 60 performs four searches ME0-Tt, ME0-Tb, ME0-Bt, ME0-Bb. The search ME0-Tb is performed in the preceding top reference field for each to-be-encoded bottom field of a macroblock. The search ME0-Bb is performed in the preceding bottom reference field for each to-be-encoded bottom field of a macroblock. The search ME0-Tt is performed in the preceding top reference field for each to-be-encoded top field of a macroblock. The search ME0-Bt is performed in the bottom reference field for each to-be-encoded top field of a macroblock.

Each search is performed for each to-be-encoded macroblock using a (0,0) starting position, i.e., centered at the same row and column of the to-be-encoded macroblock field to be predicted. Illustrative suitable search ranges are summarized in Table 2 below:

TABLE 2

| | P frames | | B frames | |
| --- | --- | --- | --- | --- |
| | Vertical | Horizontal | Vertical | Horiontal |
| ME0-Tt, ME0-Tb, ME0-Bt, ME0-Bb | ±7 | ±12 | ±5 | ±8 |

The search windows can then be as large as 32×22 pixels in each QQCIF field (assuming that searches are performed on each 8×8 sized block of each to-be encoded macroblock).

As a result of the ME0 motion estimation search stage, the motion estimation processor 60 produces four motion vectors for each to-be-encoded macroblock, namely: two forward field motion vectors for the bottom field of the macroblock, ME0-FMVTB, ME0-FMVBB (one motion vector ME0-FMVTB originating in the top reference field and one motion vector ME0 -FMVBB originating in the bottom reference field); and two forward field motion vectors ME0-FMVTT, ME0-FMVBT for the top field of the macroblock (one motion vector ME0-FMVTT originating in the top reference field and one motion vector ME0-FMVBT originating in the bottom reference field). In the case that the to-be-encoded frame is a B frame, an additional four motion vectors for the backward direction are produced for each to-be-encoded macroblock including two backward field motion vectors ME0-BMVTB, ME0-BMVBB for the bottom field of the macroblock, and two backward field motion vectors ME0-BMVTT, ME0-BMVBT for the top field of the macroblock. The motion vectors ME0-BMVTT are produced by the motion estimation processor 60 searching the succeeding top reference field for the best matching macroblock for each to-be-encoded top field of the macroblock. The motion vectors ME0-BMVTB are produced by the motion estimation processor 60 searching the succeeding top reference field for the best matching macroblock for each to-be-encoded bottom field of the macroblock. The motion vectors ME0-BMVBT are produced by the motion estimation processor 60 searching the succeeding bottom reference field for the best matching macroblock for each to-be-encoded top field of the macroblock. The motion vectors ME0-BMVBB are produced by the motion estimation processor 60 searching the succeeding bottom reference field for the best matching macroblock for each to-be-encoded bottom field of the macroblock.

Consider now the ME1 search stage. The search in the ME1 stage is performed using the (QCIF) $\frac{1}{16}$ resolution reference and to-be-encoded pictures. In the frame path, the motion estimation processor 60 performs a motion estimation search ME1-F in the reference frame that precedes the to-be-encoded picture using the (0,0) starting position. As a result of this search, a best matching macroblock is identified in the $\frac{1}{16}$ resolution version of the preceding reference frame having the motion vector ME1-FMVF. Likewise, if backwards prediction is permissible, a search is performed in the succeeding reference frame using the (0,0) starting position. As a result of this search, a best matching macroblock is identified in the $\frac{1}{16}$ resolution version of the succeeding reference frame having a motion vector of ME1-BMVF.

Similarly, field prediction during the ME1 stage is performed using the (0,0) motion vector position—the block matching search is performed in search windows centered about the to-be-encoded macroblock. Each search window is obtained from the (QCIF) $\frac{1}{16}$ resolution preprocessed picture. Like the ME0 search stage, the motion estimation processor 60 performs four field searches in the forward direction during the ME1 stage, namely, ME1-Tt, ME1-Tb, ME1-Bt and ME1-Bb. The search ME1-Tt identifies for the top field of each to-be-encoded macroblock the best matching prediction macroblock in the preceding top reference field, having the motion vector ME1-FMVTT. The search ME1-Tb identifies for the bottom field of each to-be-encoded macroblock the best matching prediction macroblock in the preceding top reference field, having the motion vector ME1-FMVTB. The search ME1-Bt identifies for the top field of each to-be-encoded macroblock the best matching prediction macroblock in the preceding bottom reference field, having the motion vector ME1-FMVBT. The search ME1-Bb identifies for the bottom field of each to-be-encoded macroblock the best matching prediction macroblock in the preceding bottom reference field, having the motion vector ME1-FMVBB. Likewise, if backward prediction is permissible, the motion estimation processor 60 performs an additional four similar searches ME1-Tt, ME1-Tb, ME1-Bt and ME1-Bb in the succeeding top and bottom reference fields. The backwards search ME1-Tt identifies for the top field of each to-be-encoded macroblock the best matching prediction macroblock in the succeeding top reference field, having the motion vector ME1-BMVTT. The backwards search ME1-Tb identifies for the bottom field of each to-be-encoded macroblock the best matching prediction macroblock in the succeeding top reference field, having the motion vector ME1-BMVTB. The backwards search ME1-Bt identifies for the top field of each to-be-encoded macroblock the best matching prediction macroblock in the succeeding bottom reference field, having the motion vector ME1-BMVBT. The backwards search ME1-Bb identifies for the bottom field of each to-be-encoded macroblock the best matching prediction macroblock in the succeeding bottom reference field, having the motion vector ME1-BMVBB.

Consider now the ME2 search stage. In the stage ME2, the motion estimation processor 60 performs each motion estimation search using the (CIF) $\frac{1}{4}$ resolution version of the reference and to-be-encoded pictures. Consider first the frame motion estimation. The motion estimation processor 60 scales (multiplies) the motion vector ME1-FMVF by two and uses the scaled motion vector ME1-FMVF×2 as the starting position for searching in the $\frac{1}{4}$ resolution version of the preceding reference picture. The motion estimation processor 60 identifies the best matching frame macroblock in the preceding reference picture having a motion vector ME2-FMVF for each to-be-encoded frame macroblock. Likewise, if backwards directed prediction is permitted, the motion estimation processor 60 scales the motion vector ME1-BMVF by two and uses the scaled motion vector ME1-BMVF×2 as the starting position for searching the $\frac{1}{4}$ resolution version of the succeeding reference picture. The motion estimation processor 60 identifies the best matching frame macroblock in the succeeding reference picture having a motion vector ME2-BMVF for each to-be-encoded frame macroblock.

Unlike the ME0 and ME1 stage field searches, but similar to the ME2 stage frame search, the motion estimation processor 60 uses previously obtained motion vectors from the ME0 and ME1 stage field searches as initial starting positions while searching in the third stage ME2. As noted above, the ME0 stage field searches produce four forward directed motion vectors and the ME1 stage field searches also produce four forward directed motion vectors. Thus, the in the ME2 stage, the motion estimation processor 60 performs eight forward directed field searches, namely, searches ME20-Tt, ME20-Tb, ME20-Bt, ME20-Bb, ME21-Tt, ME21-Tb, ME21-Bt, ME21-Bb. In the search ME20-Tt, the motion estimation processor 60 uses the motion vector ME0-FMVTT scaled by four as an initial starting position. In the search ME20-Tb, the motion estimation processor 60 uses the motion vector ME0-FMVTB scaled by four as an initial starting position. In the search ME20-Bt, the motion estimation processor 60 uses the motion vector ME0-FMVBT scaled by four as an initial starting position. In the search ME20-Bb, the motion estimation processor 60 uses the motion vector ME0-FMVBB scaled by four as an initial starting position. In the search ME21-Tt, the motion estimation processor 60 uses the motion vector ME1-FMVTT scaled by two as an initial starting position. In the search ME21-Tb, the motion estimation processor 60 uses the motion vector ME1-FMVTB scaled by two as an initial starting position. In the search ME21-Bt, the motion estimation processor 60 uses the motion vector ME1-FMVTT scaled by two as an initial starting position. In the search ME21-Bb, the motion estimation processor 60 uses the motion vector ME1-FMVBB scaled by two as an initial starting position. The motion estimation processor 60 performs each of the searches ME20-Tt, ME20-Tb, ME21-Tt and ME21-Tb in the (CIF) $\frac{1}{4}$ resolution version of the preceding top reference field and performs each of the searches ME20-Bt, ME20-Bb, ME21-Bt and ME21-Bb in the (CIF) ¼ resolution version of the preceding bottom reference field. As a result of the searches ME20-Tt, ME20-Tb, ME20-Bt, ME20-Bb, ME21-Tt, ME21-Tb, ME21-Bt, ME21-Bb, the motion estimation processor 60 produces the motion vectors (and corresponding best matching macroblocks) ME20-FMVTT, ME20-FMVTB, ME20-FMVBT, ME20-FMVBB, ME21-FMVTT, ME21-FMVTB, ME21-FMVBT and ME21-FMVBB, respectively.

Likewise, if backwards prediction is permissible during the ME2 stage, the motion estimation processor 60 performs eight backwards field searches ME20-Tt, ME20-Tb, ME20-Bt, ME20-Bb, ME21-Tt, ME21-Tb, ME21-Bt, ME21-Bb in the succeeding top and bottom reference fields. In the search ME20-Tt, the motion estimation processor 60 uses the motion vector ME0-BMVTT scaled by four as an initial starting position. In the search ME20-Tb, the motion estimation processor 60 uses the motion vector ME0-BMVTB scaled by four as an initial starting position. In the search ME20-Bt, the motion estimation processor 60 uses the motion vector ME0-BMVBT scaled by four as an initial starting position. In the search ME20-Bb, the motion estimation processor 60 uses the motion vector ME0-BMVBB scaled by four as an initial starting position. In the search ME21-Tt, the motion estimation processor 60 uses the motion vector ME1-BMVTT scaled by two as an initial starting position. In the search ME21-Tb, the motion estimation processor 60 uses the motion vector ME1-BMVTB scaled by two as an initial starting position. In the search ME21-Bt, the motion estimation processor 60 uses the motion vector ME1-BMVBT scaled by two as an initial starting position. In the search ME21-Bb, the motion estimation processor 60 uses the motion vector ME1-BMVBB scaled by two as an initial starting position. The motion estimation processor 60 performs each of the searches ME20-Tt, ME20-Tb, ME21-Tt and ME21-Tb in the (CIF) ¼ resolution version of the succeeding top reference field and performs each of the searches ME20-Bt, ME20-Bb, ME21-Bt and ME21-Bb in the (CIF) ¼ resolution version of the succeeding bottom reference field. As a result of the searches ME20-Tt, ME20-Tb, ME20-Bt, M20-Bb, ME21-Tt, ME21-Tb, ME21-Bt, ME21-Bb, the motion estimation processor 60 produces the motion vectors (and corresponding best matching macroblocks) ME20-BMVTT, ME20-BMVTB, ME20-BMVBT, ME20-BMVBB, ME21-BMVTT, ME21-BMVTB, ME21-BMVBT and ME21-BMVBB, respectively.

Next, prior to performing the ME3 search stage, the motion estimation processor 60 makes the so-called motion vertical field select decision to determine whether to use the top field originating or bottom field originating predictions for each of the to-be-encoded top field macroblock and the to-be-encoded bottom field macroblock. An additional selection step is also performed wherein the ME2 best matching field macroblock candidates and motion vector candidates generated using the ME0 motion vector candidates (i.e., ME20-FMVTT, ME20-FMVTB, ME20-FMVBT, ME20-FMVBB, ME20-BMVTT, ME20-BMVTB, ME20-BMVBT and ME20-BMVBB) are selected or the ME2 best matching field macroblock candidates and motion vector candidates generated using the ME1 motion vector candidates (i.e., ME21-FMVTT, ME21-FMVTB, ME21-FMVBT, ME21-FMVBB, ME21-BMVTT, ME21-BMVTB, ME21-BMVBT and ME21-BMVBB) are selected. This is performed in decision block 510 for each to-be-encoded top field macroblock and in decision block 520 for each to-be-encoded bottom field macroblock. Illustratively, these decisions are made on a to-be-encoded top or bottom field macroblock by to-be-encoded top or bottom field macroblock basis.

Consider first the selection of motion vectors in the decision block 510. Four motion vectors ME20-FMVTT, ME20-FMVBT, ME21-FMVTT and ME21-FMVBT are available in the forward direction that point to prediction macroblocks for predicting the top field of each to-be-encoded macroblock. In the decision block 520 the motion estimation processor 60 selects one of these motion vectors as a starting position motion vector ME2-FMVT for subsequent motion estimation search in the fourth stage ME3. Likewise, if backward prediction is permitted for encoding each to-be-encoded top field in the decision block 510, the motion estimation processor 60 selects one of the motion vectors ME20-BMVTT, ME20-BMVBT, ME21-BMVTT and ME21-BMVBT as a starting position motion vector ME2-BMVT for subsequent motion estimation search in the fourth stage ME3.

Consider now the selection of motion vectors in the decision block 520. Four vectors ME20-FMVTB, ME20-FMVBB, ME21-FMVTB and ME21-FMVBB are available in the forward direction that point to prediction macroblocks for predicting the bottom field of each to-be-encoded macroblock. In the decision block 520, the motion estimation processor 60 selects one of these motion vectors as a starting position motion vector ME2-FMVB for subsequent motion estimation search in the fourth stage ME3. Likewise, if backward prediction is permitted for encoding the to-be-encoded bottom field in the decision block 520, the motion estimation processor 60 selects one of the motion vectors ME20-BMVTB, ME20-BMVBB, ME21-BMVTB and ME21-BMVBB as a starting position motion vector ME2-BMVB for subsequent motion estimation search in the fourth stage ME3. Illustratively, the choice of motion vectors for forward and backward directed predictions are made independently from each other for each field of each to-be-encoded macroblock.

The motion estimation processor 60 performs motion estimation searching in the fourth stage ME3 on the full resolution versions of the reference and to-be-encoded pictures. For each to-be-encoded macroblock in the frame search ME3-F, the motion estimation processor 60 scales the frame motion vector ME2-FMVF by two and then uses the scaled motion vector ME2-FMVF as the starting position for searching the full resolution preceding reference frame for the best matching macroblock and motion vector ME3-FMVF thereof. If backward prediction is permitted, for each to-be-encoded macroblock, the motion estimation processor 60 scales the frame motion vector ME2-BMVF by two and uses the scaled motion vector ME2-BMVF as a starting position for searching the full resolution succeeding reference frame for the best matching macroblock and motion vector ME3-BMVF thereof.

The motion estimation processor 60 performs only a single search for each to-be-encoded field of each macroblock in each direction during the fourth stage ME3, namely, a search ME3-T and a search ME3-B. In the search ME3-T, the motion estimation processor 60 scales the motion vector ME2-FMVT by two. The motion estimation processor 60 then uses the scaled motion vector ME2-FMVT as a starting position for searching one of the full resolution preceding reference fields for the best matching field macroblock and motion vector ME3-FMVT therefor for the top field of each to-be-encoded macroblock. The top reference field is searched if the motion vertical field select decision 510 resulted in choosing one of the motion vectors originating in the top reference field for the motion vector ME2-FMVT and the bottom reference field is searched otherwise. In the ME3-B search, the motion estimation processor 60 scales the motion vector ME2-FMVB by two. The motion estimation processor 60 then uses the scaled motion vector ME2-FMVB as a starting position for searching one of the full resolution preceding reference fields for the best matching macroblock and motion vector ME3-FMVB therefor for the bottom field of each to-be-encoded macroblock. Again, if the motion vertical field select decision 520 resulted in choosing one of the motion vectors originating in a top field as the motion vector ME2-FMVB, the top field is searched and the bottom reference field is searched otherwise. If backward prediction is permitted, then the motion estimation processor 60 searches the appropriate succeeding reference fields (depending on the respective motion vertical field select decisions 510 and 520) using the motion vectors ME2-BMVT and ME2-BMVB scaled by two as starting positions for the best matching macroblocks for the top and bottom fields of each to-be-encoded macroblock, respectively, and the motion vectors ME3-BMVT and ME3-BMVB thereof.

The motion estimation processor 60 then decides in decision block 530 whether to use the frame motion vector (s) ME3-FMVF (and ME3-BMVF) and best matching frame macroblock(s) to which it (they) points (point) or the field motion vectors ME3-FMVT and ME3-FMVB (and ME3-BMVT and ME3-BMVB) and the respective best matching macroblocks to which they point, as the prediction macroblock(s). The motion estimation processor 60 also decides in decision block 540 whether to use only the forward direction best matching macroblock, only the backward directed best matching macroblock or a bidirectional interpolation of the best matching macroblocks of the forward and backward directions, as the prediction (and motion vectors pointed to by the best matching macroblocks selected to be the prediction).

Note that in searching for field prediction candidates, independent searches are performed in first and second stages ME0 and ME1 on the ¹⁄₆₄ and ¹⁄₁₆ resolution versions of the reference picture, respectively. That is, neither of these stages ME0 or ME1 relies on a motion vector obtained from the other search (or any other search for that matter) as an initial starting position. The motion vectors obtained from these searches are then used as the initial starting position for the search in the third stage ME2, and thus the search in the third stage ME2 depends on the results of both the first and second stages ME0 and ME1. This form of searching is referred to as multiple candidate hierarchical motion estimation search. In contrast, in searching for frame prediction candidates, the searches performed in each successive stage uses the results, i.e., the motion vector of the previous stage, as an initial starting position. Each successive frame search therefore depend on the preceding frame search. Since only a single motion vector candidate is used as a starting position in each stage (for each direction) this form of searching is referred to as single candidate hierarchical motion estimation search Compare this with the technique described in U.S. patent application Ser. No. 08/652,231, where the stages ME0 and ME1 are independent even for searching for frame motion vectors. In short, according to the present invention, fewer searches are performed in the frame path at the ME2 search stage than are performed according to the technique described in U.S. patent application Ser. No. 08/652,231. Such a reduction in the number of searches enables increasing the search window sizes in each other search. The search ranges can be increased to the point that the reduction in signal quality is negligible, e.g., 0.015 dB. On the other hand, a large savings in memory access time is achieved since an increase in the size of the search windows has a smaller impact on memory access time. This is because the same retrieved search window data may be used repeatedly during a search. The speed up which is achieved can be especially high when SDRAM is used as an SDRAM is capable of retrieving adjacent pixel data at a higher speed than retrieving non-adjacent pixel data.

In an alternative embodiment not described in detail herein, single candidate field searches are performed and multiple candidate frame searches are performed.

EARLY MOTION VERTICAL FIELD SELECT DECISION

Referring to FIG. 5, a second embodiment according to the present invention is shown. FIG. 5 shows only field motion estimation search paths. Any frame motion estimation search path such as is shown in FIG. 4 (single, sequential candidate search) or disclosed in U.S. patent application Ser. No. 08/652,231, may be used in conjunction with the field motion estimation search shown in FIG. 5.

The field motion estimation search according to the embodiment in FIG. 5 can be characterized as making an early or preliminary motion vertical field select decision. Specifically, motion estimation searches are performed independently, for stages ME0 and ME1 using the (0,0) initial starting position in each stage for each macroblock. Four field motion estimation searches are shown as being performed in each of stages ME0 and ME1. For each to-be-encoded frame macroblock, the motion estimation processor 60 obtains four motion vectors ME0-MVTT, ME0-MVTB, ME0-MVBT and ME0-MVBB in the stage ME0 and obtains four motion vectors ME1-MVTT, ME1-MVTB, ME1-MVBT and ME1-MVBB in stage ME1 from a corresponding preceding top or bottom best matching reference field macroblock to each corresponding preceding top or bottom best matching reference field macroblock to each corresponding top or bottom field macroblock of the to-be-encoded frame macroblock. If backwards prediction is permitted, the motion estimation processor 60 obtains an additional four motion vectors for each to-be-encoded macroblock in each of stages ME0 and ME1 corresponding to best matching macroblocks in succeeding top and bottom reference fields.

Next, the motion estimation processor 60 scales the motion vectors ME0-MVTT, ME0-MVTB, ME0-MVBT and ME0-MVCC by four and scales the motion vectors ME1-MVTT, ME1-MVTB, ME1-MVBT and ME1-MVBB by 2. The motion estimation processor 60 then makes a motion vertical field select decision 610, 620, 630 or 640 on the scaled motion vectors. In decision block 610, the motion estimation processor 60 chooses either the motion vector originating from the top reference field ME0-MVTT or from the bottom reference field ME0-MVBT for each to-be-encoded top field of the macroblock. In decision block 620, the motion estimation processor 60 chooses either the motion vector originating from the top reference field ME0-MVTB or from the bottom reference field ME0-MVBB for each to-be-encoded bottom field of the macroblock. In decision block, 630, the motion estimation processor 60 chooses either the motion vector originating from the top reference field ME1-MVTT or from the bottom reference field ME1-MVBT for each to-be-encoded top field of the macroblock. In decision block 640, the motion estimation processor 60 chooses either the motion vector originating from the top reference field ME1-MVTB or from the bottom reference field ME1-MVBB for each to-be-encoded bottom field of the macroblock. The motion estimation processor 60 makes similar motion vertical field select decisions for the backwards directed motion vectors. Again, each decision is made on a macroblock-by-macroblock basis and the decision to use top or bottom prediction macroblocks illustratively is made independently for the forward prediction field macroblock and the backward prediction field macroblock for each to-be-encoded prediction field macroblock. As a result of these decisions, a single motion vector ME0-MVT, ME0-MVB, ME1-MVT and ME1-MVB is produced by the motion estimation processor 60 for each stage ME0 and ME1 for predicting each to-be-encoded field macroblock in the forward direction. The motion vectors ME0-MVT and ME1-MVT identify the best matching macroblocks for predicting the top field of the to-be-encoded macroblock originating in the stages ME0 and ME1, respectively. The motion vectors ME0-MVB and ME1-MVB identify the best matching macroblocks for predicting the bottom field of the to-be-encoded macroblock originating in the stages ME0 and ME1, respectively. Of course, if backward prediction is permitted, an additional motion is produced for each stage ME0 and ME1 for predicting each to-be-encoded field macroblock in the backward direction.

As described above, the motion vectors are scaled before vertical field selection, but they may instead be scaled after vertical field selection but before the ME2 search stages.

Next, in search stage ME2, the motion estimation processor 60 uses each motion vector obtained for each to-be-encoded field of the macroblock as the initial starting position for searching the ¼ (CIF) resolution reference field. The motion estimation processor 60 only performs the motion estimation search in the same parity reference field as the reference field to which the respective starting position candidate motion vector ME0-MVT, ME0-MVB, ME1-MVT or ME1-MVB points. Thus, for example, if a given top field of the macroblock has a motion vector ME0-MVT pointing to a best matching macroblock in the preceding ¹⁄₆₄ resolution top reference field and a motion vector ME1-MVT pointing to a best matching macroblock in the preceding ¹⁄₁₆ resolution bottom reference field then one search is performed in the preceding ¼ resolution top reference field using ME0-MVT as an initial starting position and on search is performed in the preceding ¼ resolution bottom reference field using ME1-MVT as an initial starting position. The same holds for searches in the succeeding reference fields in the ME2 search stage, if backward directed prediction is permitted. As a result of the ME2 search stage, the motion estimation processor 60 obtains two motion vectors ME20-MVT and ME21-MVT for each to-be-encoded top field of the macroblock and obtains two motion vectors ME20-MVB and ME21-MVB for each to-be-encoded bottom field of the macroblock for the forward prediction direction. The motion vector ME20-MVT points to the best matching ¼ resolution field macroblock in a preceding reference field for the to-be-encoded top field of the macroblock obtained using the motion vector produced during the ME0 search stage as an initial starting position. The motion vector ME21-MVT points to the best matching ¼ resolution field macroblock in a preceding reference field for the to-be-encoded top field of the macroblock obtained using the motion produced during the ME1 search stage as an initial starting position. The motion vector ME20-MVB points to the best matching ¼ resolution field macroblock in a preceding reference field for the to-be-encoded bottom field of the macroblock obtained using the motion vector produced during the ME0 search stage as an initial starting position. The motion vector ME21-MVB points to the best matching ¼ resolution field macroblock in a preceding preference field for the to-be-encoded bottom field of the macroblock obtained using the motion produced during the ME1 search stage as an initial starting position. Likewise, if backwards directed prediction is permitted, an additional two motion vectors are obtained for each to-be-encoded field macroblock pointing to best matching macroblocks in succeeding reference fields, namely, one derived from the ME0 motion vector candidate and one derived from the ME1 motion vector candidate.

The motion vectors ME20-MVT, ME21-MVT, ME20-MVB and ME21-MVB are scaled by two. In decision block 650 the motion estimation processor 60 determines whether to use the scaled motion vector ME20-MVT (derived from the ME0 stage) or the scaled motion vector ME21-MVT (derived from the ME1 stage) for each to-be-encoded top field. Likewise, in decision block 660, the motion estimation processor 60 determines whether to use the scaled motion vector ME20-MVB (derived from the ME0 stage) or the scaled motion vector ME21-MVB (derived from the ME1 stage) for each to-be-encoded bottom field. The determinations 650 and 660 are made on a to-be-encoded field macroblock by to-be-encoded field macroblock basis. As a result of these determinations, a single motion vector ME2-MVT is selected for each to-be-encoded top field for the forward directed prediction and a single motion vector ME2-MVB is selected for each to-be-encoded bottom field for the forward direction prediction. When backwards directed prediction is permitted, similar decisions as shown in blocks 650 and 660 are made for each to-be-encoded field macroblock to produce an additional single motion vector for each to-be-encoded field macroblock for the backward directed prediction.

The selected motion vector for each to-be-encoded field macroblock ME2-MVT or ME2-MVB is then used as an initial starting position by the motion estimation processor 60 for performing a stage ME3 motion estimation search in the appropriate full resolution reference fields. As a result of these searches, a single motion vector candidate is produced by the motion estimation processor 60 for each to-be-encoded field of the macroblock for each permissible prediction direction. A field-frame prediction decision and a forward, backward, interpolation prediction decision can then be made. Alternatively, one or more of these decision may be made before performing the ME3 search stage.

As may be appreciated, the early motion vertical field select decisions 610–640 in stages ME0 and ME1 reduce the number of searches in the ME2 stage by 50%. If the search ranges of each search is increased, the reduction in picture quality can be made negligible. However, as noted above, the memory access demands and memory access time can be reduced. That is, by increasing the search ranges, yet reducing the number of searches, the pixel data to be transferred tends to be aggregated into large groups of adjacent pixel data. Adjacent pixel data may be re-used in other searches and nevertheless can be retrieved from an SDRAM much faster than non-adjacent pixel data.

The above discussion is intended to be merely illustrative of the invention. Those having ordinary skill in the art may device numerous alternative embodiments without departing from the spirit and scope of the following claims.

What is claimed is:

1. A method for performing motion estimation on a sequence of video pictures comprising the steps of:
    (a) processing a reference picture to generate first, second and third pictures, said first picture having a lower resolution than said second picture and said second picture having a lower resolution than said third picture, (b) using independent starting positions, performing firs and second stage field motion estimation searches using said first and second pictures, respectively, to obtain a first field motion vector candidate and a second field motion vector candidate in said first and second stages, respectively, (c) using at least one of said first and second field motion vector candidates as a starting position and said third picture, performing a third stage field motion estimation search to obtain a third field motion vector candidate, and (d) performing plural stages of frame motion estimation searches, of a hierarchical frame motion estimation search, using difference resolution versions of a reference frame, including two of said first, second and third reference pictures;

wherein at each stage of said hierarchical frame motion estimation search for a given to-be-encoded frame macroblock, only one initial starting position is searched for each possible frame motion vector in each reference frame.

2. A method for performing motion estimation on a sequence of video pictures comprising the steps of:

(a) processing a reference picture to generate first, second and third pictures, said first picture having a lower resolution than said second picture and said second picture having a lower resolution than said third picture, (b) using independent starting positions, performing first and second stage field motion estimation searches using said first and second pictures, respectively, to obtain a first field motion vector candidate and a second field motion vector candidate in said first and second stages, respectively, and (c) using at least one of said first and second field motion vector candidates as a starting position and said third picture, performing a third stage field motion estimation search to obtain a third field motion vector candidate, wherein said reference picture recedes a to-be-encoded picture, said method further comprising the steps of:

(d) processing a second reference picture that succeeds said to-be-encoded picture to generate fourth, fifth and sixth pictures, said fourth picture having a lower resolution than said fifth picture and said fifth picture having a lower resolution than said fourth picture, (e) performing first and second stage field motion estimation searches using said fourth and fifth pictures, respectively, to obtain a fourth field motion vector candidate and a fifth field motion vector candidate in said first and second stages, respectively, and (f) using at least one of said fourth and fifth field motion vector candidates as a starting position and said sixth picture, performing a third stage field motion estimation search.

3. The method of claim 2 further comprising the steps of:

(g) performing steps (b), (c), (e) and (f) for each of plural field macroblocks of said to-be-encoded frame, and (h) determining whether to predict each of said macroblocks of said to-be-encoded picture using prediction information derived from said reference picture, prediction information derived from said second reference picture or an interpolation of prediction information derived from said reference picture and prediction information derived from said second reference picture.

4. A method for performing motion estimation on a sequence of video pictures comprising the steps of:

(a) processing a reference picture to generate first, second and third pictures, said first picture having a lower resolution than said second picture and said second picture having a lower resolution than said third picture, (b) using independent starting positions, performing first and second stage field motion estimation searches using said first and second pictures, respectively, to obtain a first field motion vector candidate and a second field motion vector candidate in said first and second stages, respectively, (c) using at least one of said first and second field motion vector candidates as a starting position and said third picture, performing a third stage field motion estimation search to obtain a third field motion vector candidate, (d) performing frame motion estimation on said reference picture, and (e) determining whether to predict each of said macroblocks of said to-be-encoded frames as a frame macroblock using prediction information derived from said frame motion estimation or as plural field macroblocks using prediction information derived from said third stage field motion estimation searches.

5. A method for performing motion estimation on a sequence of video pictures comprising the steps of:

(a) processing a reference picture to generate first, second and third pictures, said first picture having a lower resolution than said second picture and said second picture having a lower resolution than said third picture, (b) using independent starting positions, performing first and second stage field motion estimation searches using said first and second pictures, respectively, to obtain a first field motion vector candidate and a second field motion vector candidate in said first and second stages, respectively, (c) using at least one of said first and second field motion vector candidates as a starting position and said third picture, performing a third stage field motion estimation search to obtain a third field motion vector candidate, (d) performing said third stage field motion estimation search using said first field motion vector candidate as a starting position and said third picture to produce a third motion vector and performing said third stage field motion estimation search using said second field motion vector candidate as a starting position and said third picture to produce a fourth motion vector, (e) selecting only one of said third and fourth motion vectors, and (f) performing a fourth stage motion estimation search in said reference picture using said selected motion vector as an initial starting position, said third picture having a lower resolution than said reference picture.

6. A method for performing motion estimation on a sequence of video pictures comprising the steps of:

(a) processing a reference picture to generate first, second and third pictures, said first picture having a lower resolution than said second picture and said second picture having a lower resolution than said third picture, (b) using independent starting positions, performing first and second stage field motion estimation searches using said first and second pictures, respectively, to obtain a first field motion vector candidate and a second field motion vector candidate in said first and second stages, respectively, (c) using at least one of said first and second field motion vector candidates as a starting position and said third picture, performing a third stage field motion estimation search to obtain a third field motion vector candidate, wherein said reference picture is a frame and said first, second and third pictures are scaled versions of a first field of said reference picture, said method further comprising the steps of:

(d) processing said reference picture to produce fourth, fifth and sixth fields, wherein said fourth, fifth and sixth fields are scaled versions of a second field of said reference picture, said fourth field having a lower resolution than said fifth field and said fifth field having a lower resolution than said sixth field, (e) performing first and second stage field motion estimation searches using said fourth and fifth fields, respectively, to obtain a fourth field motion vector candidate and a fifth field motion vector candidate in said first and second stages, respectively, (f) using at least one of said fourth and fifth field motion vector candidates as a starting position and said sixth field, performing a third stage field motion estimation search to obtain a sixth field motion vector candidate, (g) selecting either said third field motion vector candidate and said first field of said reference picture or said sixth field motion vector candidate and said second field of said reference picture, and (h) using said selected field motion vector candidate as a starting position and said selected field of said reference picture, performing a fourth stage field motion estimation search.

7. A method of claim 6 further comprising the steps of:

(i) performing steps (b), (c), (e), (f), (g) and (h) for each of plural field macroblocks of each of plural frame macroblocks of a to-be-encoded frame, and (j) predicting each of said plural frame macroblocks of said to-be-encoded frame as a frame macroblock using prediction information derived from a frame motion estimation or as plural field macroblocks using prediction information derived from said fourth stage field motion estimation search.

8. A method for performing motion estimation on a sequence of video pictures comprising the steps of:

(a) processing a reference picture to generate, first, second and third pictures, said first picture having a lower resolution than said second picture and said second picture having a lower resolution than said third picture, (b) performing a first stage field motion estimation search using said first picture to obtain a first motion vector from a top reference field and a second motion vector from a bottom reference field, (c) performing a second field motion estimation search using said second picture to obtain a third motion vector from said top reference field and a fourth motion vector from said bottom reference field, (d) selecting one of said first and second motion vectors as a fifth motion vector and selecting one of said third and fourth motion vectors as a sixth motion vector, and (e) using said fifth and sixth motion vectors as starting positions and said third picture, performing a third stage field motion estimation search to generate seventh and eighth motion vectors, respectively.

9. The method of claim 8 further comprising the steps of:

(f) repeating steps (b)–(e) for each of plural macroblocks.

10. The method of claim 8 further comprising the steps of:

(f) selecting one of said seventh and eight motion vectors, and (g) using said selected motion vector and said reference picture, performing a fourth stage motion estimation search.

11. The method of claim 8 wherein said reference picture precedes a to-be-encoded picture, said method further comprising the steps of:

(f) processing a second reference picture that succeeds said to-be-encoded picture to generate, fourth, fifth and sixth, pictures, said fourth picture having a lower resolution than said fifth picture and said fifth picture having a lower resolution than said sixth picture, (g) performing a first stage field motion estimation search using said fourth picture to obtain a ninth motion vector from a top reference field of said fourth picture and a tenth motion vector from a bottom reference field of said fourth picture, (h) performing a second stage field motion estimation search using said fifth picture to obtain an eleventh motion vector from a top reference field of said fifth picture and a twelfth motion vector from a bottom reference field of said fifth picture, (i) selecting one of said ninth and tenth motion vectors as a thirteenth motion vector and selecting one of said eleventh and twelfth motion vectors as a fourteenth motion vector, and (j) using said thirteenth and fourteenth motion vectors as starting positions and said sixth picture, performing a third stage field motion estimation search to generate fifteenth and sixteenth motion vectors, respectively.

12. An apparatus for performing motion estimation on a sequence of video pictures comprising:

a preprocessor for processing a reference picture to generate first, second and third pictures, said first picture having a lower resolution than said second picture and said second picture having a lower resolution than said third picture, and a motion estimator for, using independent starting positions, performing first and second stage field motion estimation searches using said first and second pictures, respectively, to obtain a first field motion vector candidate and a second field motion vector candidate in said first and second stages, respectively, for using at least one of said first and second field motion vector candidates as a starting position and said third picture, performing a third stage field motion estimation search to obtain a third field motion vector candidate, and for performing plural stages of frame motion estimation searches, of a hierarchical frame motion estimation search, using different resolution versions of a reference frame, including two of said first, second and third reference pictures, wherein at each stage of said hierarchical frame motion estimation search for a given to-be-encoded frame macroblock, only one initial starting position is searched for each possible frame motion vector in each reference frame.

13. An apparatus for performing motion estimation on a sequence of video pictures comprising:

a preprocessor for processing a reference picture to generate first, second and third pictures, said first picture having a lower resolution than said second picture and said second picture having a lower resolution than said third picture, and a motion estimator for, using independent starting positions, performing first and second stage field motion estimation searches using said first and second pictures, respectively, to obtain a first field motion vector candidate and a second field motion vector candidate in said first and second stages, respectively, and for using at least one of said first and second field motion vector candidates as a starting position and said third picture, performing a third stage field motion estimation search to obtain a third field motion vector candidate, wherein said reference picture precedes a to-be-encoded picture, wherein said preprocessor is also for processing a second reference picture that succeeds said to-be-encoded picture to generate fourth, fifth and sixth pictures, said fourth picture having a lower resolution than said fifth picture and said fifth picture having a lower resolution than said fourth picture, and wherein said motion estimator is also for performing first and second stage field motion estimation searches using said fourth and fifth pictures, respectively, to obtain a fourth field motion vector candidate and a fifth field motion vector candidate in said first and second stages, respectively, and for, using at least one of said fourth and fifth field motion vector candidates as a starting position and said sixth picture, performing a third stage field motion estimation search.

14. The apparatus of claim 13 wherein said motion estimator performs first, second and third stage field motion estimation searches for each of plural field macroblocks of said to-be-encoded frame, and determines whether to predict each of said macroblocks of said to-be-encoded picture using prediction information derived from said reference picture, prediction information derived from said second reference picture or an interpolation of prediction information derived from said reference picture and prediction information derived from said second reference picture.

15. An apparatus for performing motion estimation on a sequence of video pictures comprising:

a preprocessor for processing a reference picture to generate first, second and third pictures, said first picture having a lower resolution than said second picture and said second picture having a lower resolution than said third picture, a motion estimator for, using independent starting positions, performing first and second stage field motion estimation searches using said first and second pictures, respectively, to obtain a first field motion vector candidate and a second field motion vector candidate in said first and second stages, respectively, and for using at least one of said first and second field motion vector candidates as a starting position and said third picture, performing a third stage field motion estimation search to obtain a third field motion vector candidate, wherein said motion estimator is also for performing frame motion estimation of said reference picture, and wherein said motion estimator is also for determining whether to predict each of said macroblocks of said to-be-encoded frames as a frame macroblock using prediction information derived from said frame motion estimation or as plural field macroblocks using prediction information derived from said third stage field motion estimation searches.

16. An apparatus for performing motion estimation on a sequence of video pictures comprising:

a preprocessor for processing a reference picture to generate first, second and third pictures, said first picture having a lower resolution than said second picture and said second picture having a lower resolution than said third picture, a motion estimator for, using independent starting positions, performing first and second stage field motion estimation searches using said first and second pictures, respectively, to obtain a first field motion vector candidate and a second field motion vector candidate in said first and second stages, respectively, and for using at least one of said first and second field motion vector candidates as a starting position and said third picture, performing a third stage field motion estimation search to obtain a third field motion vector candidate, wherein said motion estimator is also for performing said third stage field motion estimation search using said first field motion vector candidate as a starting position and said third picture to produce a third motion vector and performing said third stage field motion estimation search using said second field motion vector candidate as a starting position and said third picture to produce a fourth motion vector, for selecting only one of said third and fourth motion vectors, and for performing a fourth stage motion estimation search in said reference picture using said selected motion vector as an initial starting position, said third picture having a lower resolution than said reference picture.

17. An apparatus for performing motion estimation on a sequence of video pictures comprising:

a preprocessor for processing a reference picture to generate first, second and third pictures, said first picture having a lower resolution than said second picture and said second picture having a lower resolution than said third picture, a motion estimator for, using independent starting positions, performing first and second stage field motion estimation searches using said first and second pictures, respectively, to obtain a first field motion vector candidate and a second field motion vector candidate in said first and second stages, respectively, and for using at least one of said first and second field motion vector candidates as a starting position and said third picture, performing a third stage field motion estimation search to obtain a third field motion vector candidate, wherein said preprocessor processes a frame as said reference picture, said first, second and third pictures being scaled versions of a first field of said reference picture, said preprocessor also for processing said reference picture to produce fourth, fifth and sixth fields, wherein said fourth, fifth and sixth fields are scaled versions of a second field of said reference picture, said fourth field having a lower resolution than said fifth field and said fifth field having a lower resolution than said sixth field, and wherein said motion estimator is also for performing first and second stage field motion estimation searches using said fourth and fifth fields, respectively, to obtain a fourth field motion vector candidate and a fifth field motion vector candidate in said first and second stages, respectively, for, using at least one of said fourth and fifth field motion vector candidates as a starting position and said sixth field, performing a third stage field motion estimation search to obtain a sixth field motion vector candidate, for selecting either said third field motion vector candidate and said first field of said reference picture, and for, using said selected field motion vector candidate as a starting position and said selected field of said reference picture, performing a fourth stage field motion estimation search.

18. The apparatus of claim 17:

wherein said motion estimator performs first, second and third stage field motion estimation searches for each of plural field macroblocks of each of plural frame macroblocks of a to-be-encoded frame, said motion estimator also for predicting each of said plural frame macroblocks of said to-be-encoded frame as a frame macroblock using prediction information derived from a frame motion estimation or as plural field macroblocks using prediction information derived from said fourth stage field motion estimation search.

19. An apparatus for performing motion estimation on a sequence of video pictures comprising:

a preprocessor for processing a reference picture to generate, first, second and third pictures, said first picture having a lower resolution than said second picture and said second picture having a lower resolution than said third picture, and a motion estimator for performing a first stage field motion estimation search using said first picture to obtain a first motion vector from a top reference field and a second motion vector from a bottom reference field, for performing a second stage field motion estimation search using said second picture to obtain a third motion vector from said top reference field and a fourth motion vector from said bottom reference field, for selecting one of said first and second motion vectors as a fifth motion vector and selecting one of said third and fourth motion vectors as a sixth motion vector, and for, using said fifth and sixth motion vectors as starting positions and said third picture, performing a third stage field motion estimation search to generate seventh and eighth motion vectors, respectively.

20. The apparatus of claim 19 wherein said motion estimator performs first, second and third stage field motion estimation for each of plural macroblocks.

21. The apparatus of claim 19 wherein said motion estimator is also for selecting one of said seventh and eight motion vectors, and for, using said selected motion vector and said reference picture, performing a fourth stage motion estimation search.

22. The apparatus of claim 19 wherein said reference picture precedes a to-be-encode picture, and wherein:

said processor is also for processing a second reference picture that succeeds said to-be-encoded picture to generate, fourth, fifth and sixth, pictures, said fourth picture having a lower resolution than said fifth picture and said fifth picture having a lower resolution than said sixth picture, and said motion estimator is also for performing a first stage field motion estimation search using said fourth picture to obtain a ninth motion vector from a top reference field of said fourth picture and a tenth motion vector from a bottom reference field of said fourth picture, for performing a second stage field motion estimation search using said fifth picture to obtain an eleventh motion vector from a top reference field of said fifth picture and a twelfth motion vector from a bottom reference field of said fifth picture, for selecting one of said ninth and tenth motion vectors as a thirteenth motion vector and selecting one of said eleventh and twelfth motion vectors as a fourteenth motion vector, and for, using said thirteenth and fourteenth motion vectors as starting positions and said sixth picture, performing a third stage field motion estimation search to generate fifteenth and sixteenth motion vectors, respectively.

* * * * *